United States Patent
Sood et al.

(10) Patent No.: US 9,618,995 B2
(45) Date of Patent: Apr. 11, 2017

(54) SYSTEM AND METHOD FOR DISPLAYING CONTENT ON A COMPUTING DEVICE DURING AN INACTIVE OR OFF-STATE

(71) Applicant: RAKUTEN KOBO, Inc., Toronto (CA)

(72) Inventors: Ryan Sood, Toronto (CA); Damian Lewis, Toronto (CA)

(73) Assignee: RAKUTEN KOBO, INC., Toronto (CA)

( * ) Notice: Subject to any disclaimer, the term of this patent is extended or adjusted under 35 U.S.C. 154(b) by 261 days.

(21) Appl. No.: 13/929,482

(22) Filed: Jun. 27, 2013

(65) Prior Publication Data

US 2015/0006929 A1    Jan. 1, 2015

(51) Int. Cl.
*G06F 1/32*    (2006.01)

(52) U.S. Cl.
CPC .......... *G06F 1/3206* (2013.01); *G06F 1/3234* (2013.01); *G06F 1/3265* (2013.01)

(58) Field of Classification Search
CPC ..... G06F 1/00; G06F 1/04; G06F 1/12; G06F 1/26; G06F 1/32; G06F 11/30; G06F 15/16
See application file for complete search history.

(56) References Cited

U.S. PATENT DOCUMENTS

| | | | |
|---|---|---|---|
| 6,590,597 B1* | 7/2003 | Kim | 715/866 |
| 9,076,143 B1* | 7/2015 | Yehoshua | G06Q 30/00 |
| 2008/0201215 A1* | 8/2008 | Lin | G06Q 30/02 705/14.62 |
| 2008/0218437 A1* | 9/2008 | Shimoi | G06F 11/327 345/30 |
| 2009/0102807 A1* | 4/2009 | Kashiwa | G06F 15/025 345/173 |
| 2010/0013818 A1* | 1/2010 | Akai | G09G 3/3651 345/212 |
| 2011/0087602 A1* | 4/2011 | Rutman | G06Q 20/1235 705/52 |
| 2011/0225366 A1* | 9/2011 | Izadi et al. | 711/118 |
| 2011/0254824 A1* | 10/2011 | Chuang | G09G 3/344 345/212 |
| 2013/0044364 A1* | 2/2013 | Yeh | G02F 1/167 359/296 |
| 2013/0075475 A1* | 3/2013 | Hart | G06K 19/07707 235/492 |
| 2013/0093777 A1* | 4/2013 | He et al. | 345/522 |
| 2013/0138728 A1* | 5/2013 | Kim | G06F 15/16 709/203 |
| 2013/0151347 A1* | 6/2013 | Baldwin | G06F 15/16 705/14.66 |
| 2014/0279418 A1* | 9/2014 | Rubinstein | G06Q 40/00 705/39 |

* cited by examiner

*Primary Examiner* — Thomas Lee
*Assistant Examiner* — Mohammad A Rahman
(74) *Attorney, Agent, or Firm* — Oblon, McClelland, Maier & Neustadt, L.L.P.

(57) ABSTRACT

Usage of a computing device is monitored when the computing device is in an active state. A content screen is stored corresponding to a digital content item that is in use when the computing device is in the active state. In response to the computing device being placed in an inactive state, the content screen is displayed on a display of the computing device.

21 Claims, 6 Drawing Sheets

SYSTEM AND METHOD FOR DISPLAYING CONTENT ON A COMPUTING DEVICE DURING AN INACTIVE OR OFF-STATE

TECHNICAL FIELD

Examples described herein relate to a system and method for displaying content on a computing device during an inactive or off-state.

BACKGROUND

"E-books" are a form of an electronic publication that can be viewed on computing devices with suitable functionality. Multi-function devices, such as cellular-telephony or messaging devices, can utilize specialized applications (E.g., e-reader apps) to view e-books. Still further, some devices, sometimes labeled as "e-readers" can be centric towards content viewing, and e-book viewing in particular.

DETAILED DESCRIPTION

Figure 1:
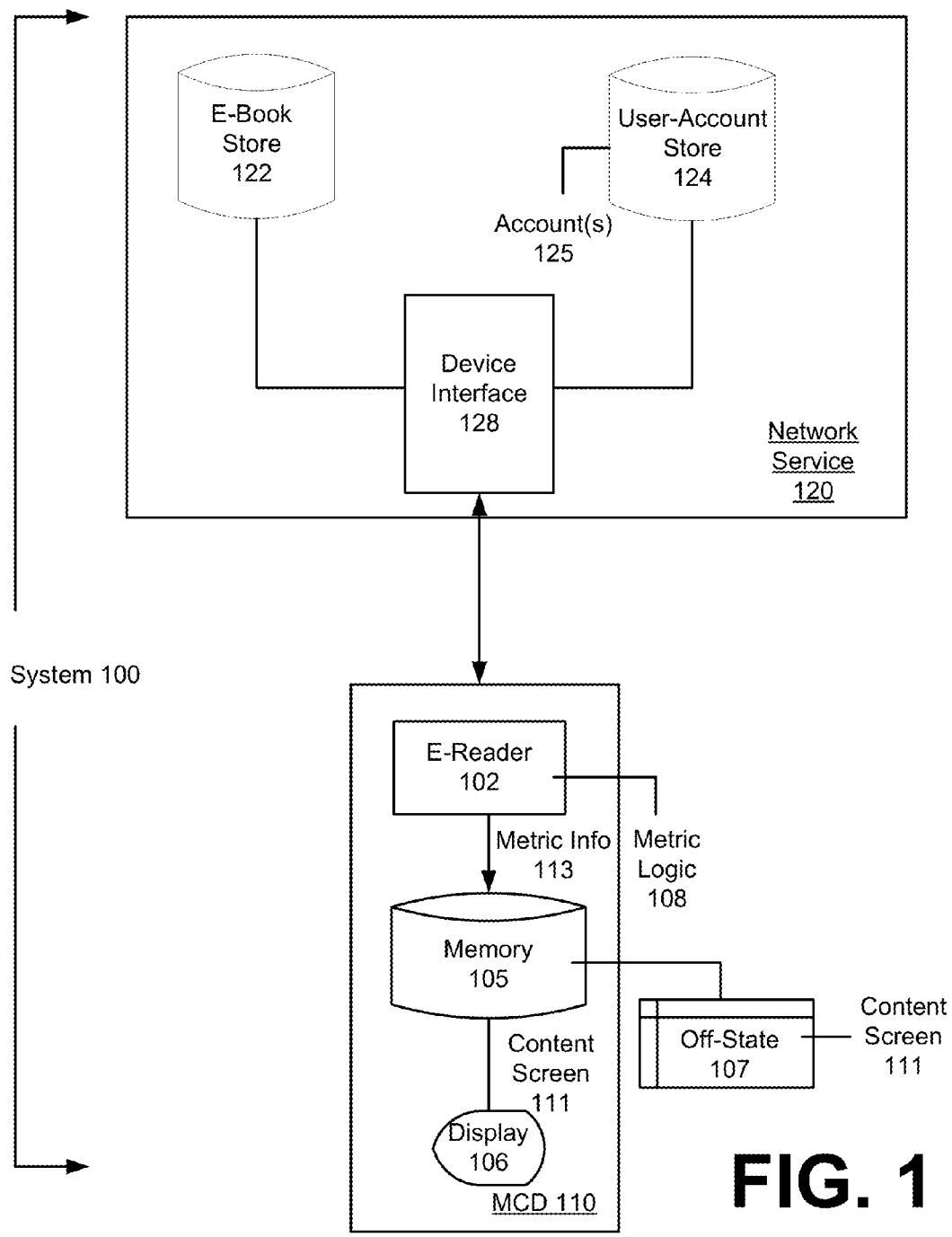
FIG. 1 illustrates a system for displaying content on a computing device.

According to examples provided herein, a computing device is operated to display a user-relevant content screen when switched to an off-state. The user-relevant content screen can include a visual representation of a digital content item that is actively used on the computing device. As an addition or alternative, the user-relevant content screen can include metric information that is descriptive of the user's consumption or interaction with a selected active digital content item.

More generally, in some variations, the computing device is operated to display a visual representation of a digital content item that is actively used on the computing device when the computing device is in an inactive state (e.g., on but with low-power).

As used herein, an "off-state" means that a computing device is switched into a state where it does not respond to inputs from a user, other than input to first switch into an on-state (where it can respond to user input). The reference to "off-state" content or content screens includes content that can be displayed on electrical paper type displays, or other display mediums, which hold content while in an off-state. Electrical paper type displays, for example, are capable of outputting content in a static or frozen form when placed in an off-state.

Still further, in some examples, a computing device is operated to determine usage parameters regarding a user's consumption of an active digital content item. The usage information can be displayed as metric information. In some examples, the metric information can be provided as part of the content screen when the computing device is in the off-state.

According to some examples, the usage of a computing device is monitored when the computing device is in an active state. A content screen is stored corresponding to a digital content item that is in use when the computing device is in the active state. In response to the computing device being placed in an inactive state, the content screen is displayed on a display of the computing device.

As used herein, a "digital content item" can be provided in the form of one or more files that include content (e.g., content portion). Digital content items can also include various kinds of metadata (e.g., metadata portion), including metadata for providing a visual representation of the digital content item. With respect to examples described herein, digital content items can include, for example, audio playback content items (e.g., songs), video playback content items (e.g., television shows, movies, music videos), e-books, electronic magazines, digital comic books and multimedia games. While numerous embodiments described herein make reference to e-books, it should be appreciated that e-books are just one example of a digital content item for use with examples as described, and embodiments described herein are applicable to digital content items other than e-books, such as songs (or albums), videos (e.g., movies, television shows, video clips, music videos, etc.), or other works that can be embodied in a digital medium.

"E-books" are a form of an electronic publication that can be viewed on computing devices with suitable functionality. Multi-function devices, such as cellular-telephony or messaging devices, can utilize specialized applications (e.g., e-reader apps) to view e-books. Still further, some devices (sometimes labeled as "e-readers") can be centric towards content viewing, and e-book viewing in particular.

One or more embodiments described herein provide that methods, techniques and actions performed by a computing device are performed programmatically, or as a computer-implemented method. Programmatically means through the use of code, or computer-executable instructions. A programmatically performed step may or may not be automatic.

One or more embodiments described herein may be implemented using programmatic modules or components. A programmatic module or component may include a program, a subroutine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Furthermore, one or more embodiments described herein may be implemented through the use of instructions that are executable by one or more processors. These instructions may be carried on a computer-readable medium. Machines shown or described with figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash or solid state memory (such as carried on many cell phones and consumer electronic devices) and magnetic memory. Computers, terminals, network enabled devices (e.g., mobile devices such as cell phones) are all examples of machines and devices that utilize processors, memory, and instructions stored on computer-readable mediums. Additionally, embodiments may be implemented in the form of computer-programs, or a computer usable carrier medium capable of carrying such a program.

SYSTEM OVERVIEW

FIG. 1 illustrates a system for displaying content on a computing device. In an example of FIG. 1, system 100 includes a mobile computing device 110 and a network service 120. The network service 120 can be implemented with multiple servers and other computing resources that provide various e-book services, including services in which e-books or sold, shared, downloaded and/or stored. In some implementations, the mobile computing device 110 is equipped with hardware and software to optimize reading electronic content, including e-books. For example, the mobile computing device 110 can have a tablet like form factor, although variations are possible. In some embodiments, the mobile computing device 110 corresponds to an e-reader device, and incorporates a display assembly 106 that is of an electronic paper type. Among characteristics of electronic paper type displays, the mobile computing device 110 can display content even when in an off-state. In particular, static content can be displayed on the computing device 110 while the device is in the off-state.

In variations, the mobile computing device 110 can correspond to any computing device on which an e-book can be rendered and consumed. For example, the mobile computing device 110 can correspond to a tablet, telephony/messaging device (e.g., smart phone) or portable computing device. The mobile computing device 110 can run an e-reader application that links the device to the network service 120 and enables e-books provided through the service to be viewed and consumed.

The network service 120 can include a device interface 128 to communicate with individual devices that access the service. Among other resources, the network service 120 can include an e-book store 122 and a user account store 124. The user account store 124 can associate mobile computing device 110 with a user and an account 125. The account 125 can also be associated with one or more e-books, which can be stored in the e-book store 122. As described further, the user account store 124 can retain metadata for individual accounts 125 to identify e-books that have been purchased or made available for consumption for a given account. The metadata can include lists that are specific to the user account 125, as well as to one or more devices that are associated with the user account. The mobile computing device 110 may be associated with the account 125, and multiple devices may be associated with the same account. As described in greater detail below, the mobile computing device 110 can store e-books that are purchased or otherwise made available to the user of the mobile computing device 110, as well as archive e-books that have been purchased for the account 125, but are not stored on the particular mobile computing device.

In some embodiments, mobile computing device 110 includes an e-reader component 102. The e-reader component 102 displays e-books stored locally in memory 105 of the mobile computing device. The e-reader component 102 can also provide various interfaces, such as described with an example of FIG. 3, in order to enable functionality such as page/chapter turns, word searching, downloading etc. The memory 105 of the mobile computing device 110 can also include an off-state component 107 or portion where a content screen for an actively in use e-book is stored. The off-state memory 107 can be a dedicated memory resource and/or implemented through programming. The content screen 111 can be generated at least in part from a selected e-book that is in active use (e.g., unread, recently accessed and being viewed). For example, as described with an example of FIG. 6A and FIG. 6B, the content screen 111 can display information and images corresponding to a cover of an e-book.

In some embodiments, the e-reader component 102 of the mobile computing device 110 (or other functionality) can monitor for designated usage parameters regarding the user's reading actions and behavior. Various kinds of usage parameters can be identified, such as described with an example of FIG. 5. A metric logic 108 can include algorithms or criteria for determining the usage parameters. The usage parameters can be stored as user-specific metric information 113, in association with a particular e-book that is actively being used. The metric information 113 can be integrated or made part of the content screen 111, which is displayed on the display assembly 106 when the computing device is placed in the off-state.

In variations, the mobile computing device 110 displays the content screen when the e-reader component 102 (or the device) is in an inactive state (rather than an off-state). By way of example, the mobile computing device 110 can display the content screen 111 on an LCD type display to simulate, for example, a wall paper or provide a screensaver.

Figure 2:
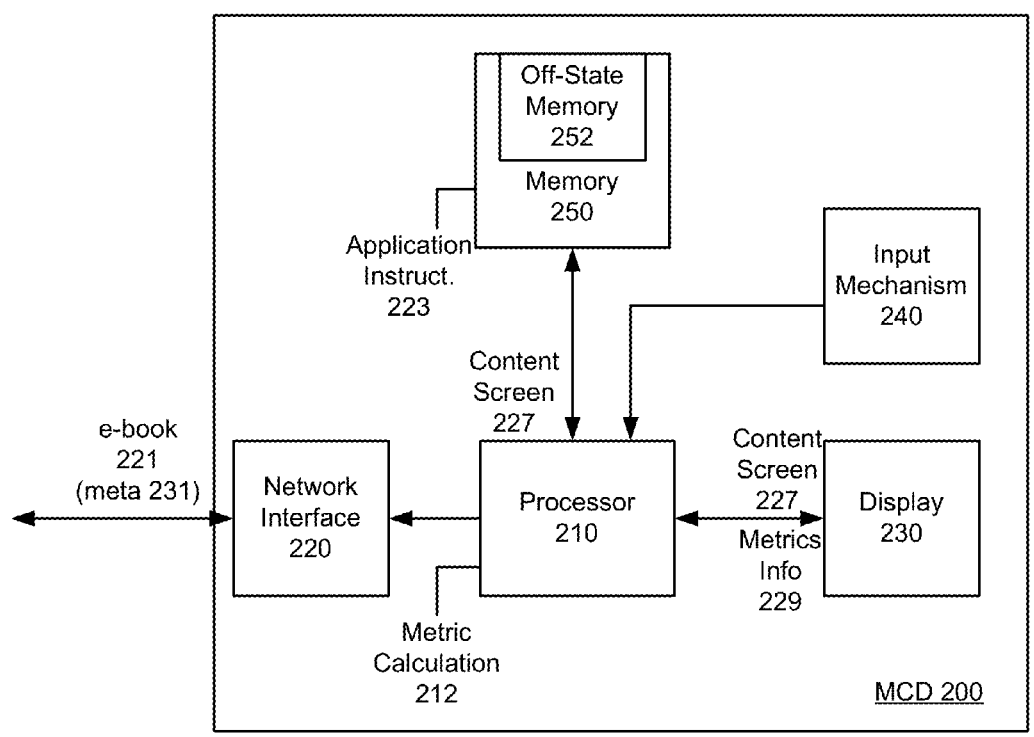
FIG. 2 illustrates an example of mobile computing device in accordance with one or more embodiments described herein.

FIG. 2 illustrates an example of mobile computing device in accordance with one or more embodiments described herein. The mobile computing device 200 can include a processor 210, a network interface 220, a display 230, one or more input mechanisms 240, and a memory 250. The processor 210 can utilize the network interface 220 to communicate with a network service 120 (see FIG. 1). Accordingly, the computing device 200 provides an example of mobile computing device 110 (as shown with FIG. 1), for use with network service 120. The network interface 220 can include hardware and/or software to link the computing device 200 to a network (e.g., Internet), and further to access a network service such as described with an example of FIG. 1. In communicating with the network service 120, the mobile computing device 200 can receive e-books 221 that the user has purchased or otherwise selected to download from the network service. The e-books 221 that are downloaded onto them mobile computing device 110 may be stored in the memory 250.

The input mechanism 240 can correspond to, for example, a touch interface, such as one integrated with the display 230 (e.g., touchscreen). As an addition or alternative, the input mechanism 240 can correspond to a microphone, for which speech recognition logic (e.g., application running on processor 210) can interpret as text input. Still further, the input mechanism 240 can correspond to a set of buttons or switches, including a keyboard or button set, that the user can operate to define a new list, as well as to select items for either a new or existing list.

In some embodiments, the display 230 corresponds to an electronic paper type display, which is designed to mimic conventional paper in the manner in which they display content. Examples of such display technologies include electrophoretic displays, electrowetting displays, and electrofluidic displays. Examples described herein further appreciate that the media in which electronic type displays are provided can vary, and include, for example, plastic or paper combined with transistor elements or other circuitry. In variations, the display 230 can correspond to, for example, a liquid crystal display (LCD) or light emitting diode (LED) display that illuminates in order to provide content generated from processor 210.

The memory 250 can store e-books 221, as well as instructions 223 for enabling applications (e.g., e-reader component 102). The stored e-books 221 can include, or be provided with metadata 231, which can include imagery (e.g., cover art) and text (e.g., title, author, summary, reviews) about the content.

The processor 210 can execute instructions for providing functionality for the mobile computing device 200. Among operations, the processor 210 can signal the display 230 to provide the content screen 227 when the computing device (or display 230) is in the off-state. The content screen 227 can, for example, be displayed as static content on an electronic paper type display. The processor 210 can signal the display 230 to provide the content screen 227 in response to the computing device 200 being triggered to the off-state. Accordingly, the processor 210 can perform operations to switch the device as a whole into an off-state (or low-power state).

As an addition or alternative, some embodiments provide that the processor 210 implements metric calculation operations 212 in order to determine usage parameters regarding the consumption of an active e-book. The usage parameters can be displayed as user-specific metric information 229. In some example, the user-specific metric information 229 can be displayed as part of the content screen 227. By way of example, the usage parameters determined from the metric calculation operations 212 can include (i) determining portion of e-book that is completed or uncompleted, (ii) determining a rate of completion (or reading rate) for a segment (e.g., page or chapter) of the e-book, and/or (iii) determining when the user reads a particular e-book. The metric information 229 can include a text phrase or other content that reflects a determination of one or more of the usage parameters. For example, the metric information 229 can reflect a percentage of an e-book that is complete, a portion of a chapter that is unread, or the amount of time remaining for the user to complete an e-book (based on reading rate).

Figure 3:
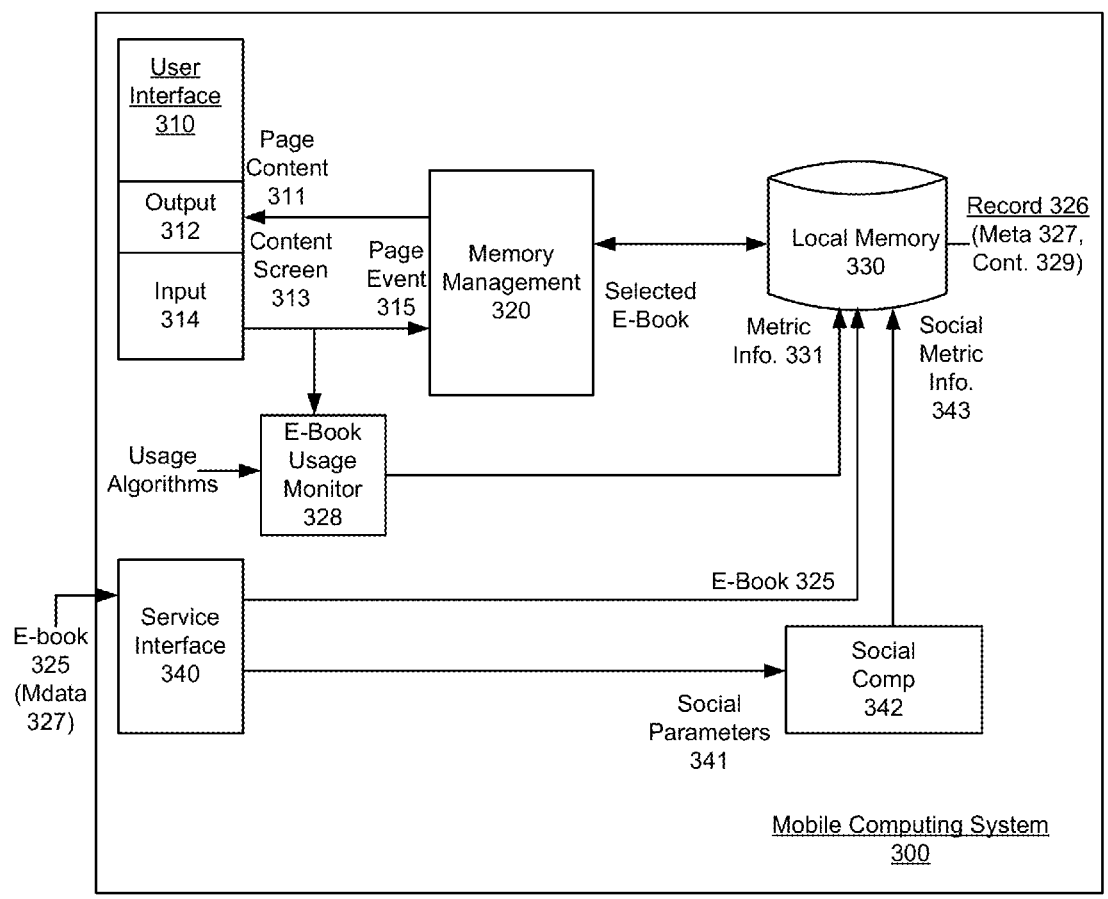
FIG. 3 illustrates a device system for providing content about an e-book on a mobile computing device, according to an embodiment.

FIG. 3 illustrates a device system for providing item-specific content on a computing device, according to an embodiment. In reference to FIG. 3, a mobile computing device can implement the system 300 using programmatic components that enable communications with an e-book service (such as network service 120, shown in FIG. 1). In some implementations, the components of system 300 can be implemented as an application that runs on a mobile computing device (e.g., such as shown by FIG. 1 or FIG. 2).

In an example of FIG. 3, the system 300 includes a user interface 310, a memory management module 320, a local memory 330, and a service interface 340. The programmatic components shown with the computing system 300 can be implemented in part as operating system level components. In variations, however, some or all of the programmatic components shown with the computing system 300 can be provided as part of an application that runs on the computing system 300. For example, the user can download an application onto mobile computing device, to obtain functionality such as described herein, as well as to communicate with a network service 120. Alternatively, the application can be embedded or otherwise preinstalled with other programmatic elements for providing such functionality on a computing device.

The service interface 340 includes application and logic which enables the device to use, for example, a wireless Internet connection, to connect to the network service 120 (see FIG. 1). In connecting with the service, the service interface 340 can transmit data that enables the network service 120 to identify the mobile computing device on which system 300 is implemented, so that the network service 120 can determine the account associated with the mobile computing device. The service interface 340 can be used to retrieve e-books 325 from the network service 120. For example, in identifying the mobile computing device of system 300 to the network service 120, the network service may be able to procure payment information (e.g., stored credit card) that can be used to charge users account when purchasing a new e-book. Each e-book can correspond to a literary work, having pagination, chapter designations and optionally graphics and formatting. Individual e-books 325 can also include metadata 327, such as imagery provided as a cover for the e-book when the e-book is marketed (e.g., similar to the manner in which a conventional hardbound book would be marketed in a retail store). In one implementation, the network service 120 can retrieve or otherwise identify the imagery and other metadata 327 of individual e-books from publisher sources.

In identifying the mobile computing device of system 300, the network service 120 can identify what e-books belong to the account of that device. E-books that are transmitted to the mobile computing device of system 300 include those that are purchased from the device, or those that the user requested to download. In variations, e-books can automatically be downloaded to the device in response to the occurrence of certain conditions. For example, the user can purchase an e-book on another device, and then subsequently connect to the network service 120 via the mobile computing device of system 300 to automatically receive their previously purchased e-book. Alternatively, network service 120 can be configured to push e-books to the mobile computing device of system 300, based on, for example, user account settings, subscription rules, and various other business logic considerations.

Additionally, the service interface 340 can include processes for automatically receiving updates from a network service 120. The updates can include programmatic updates, including updates to existing components on the device, as well as updates to lists, e-books that the user may have purchased on another device of the same account, recommendations from the network as to what a given user may want to purchase our view, and various other data that can be either generally provided to users of the network service 120, or specifically provided for the particular account or user.

According to some embodiments, the local memory 330 stores each e-book 325 as a record 326 that includes metadata 327 and content 329 (e.g., page content). Among other benefits, the management module 320 can retrieve portions of individual e-books for purpose or rendering e-books via the use-interface 310.

Among other functionality, the user interface 310 can include an output component 312 and an input component 314. When the mobile computing device of system 300 is in an active state, the output component 312 can display page content 311 corresponding to, for example, a page or multiple pages of an e-book. Additionally, the output component 312 can display static content corresponding to a content screen 313. In an implementation in which the display of the computing device is provided as an electronic paper type display, the content screen 313 can be provided in static form when the computing device of system 300 is in an off-state. In other variations, the content screen 313 can be provided when the display of the computing device is in a low-power and/or energy conservation state.

In some embodiments, the content screen 313 is specific to an e-book that is in active use (e.g., e-book that is being read). Still further, the content screen 313 can be based on metadata of an e-book that is stored in the local memory 330 and in active use. For example, the content screen 313 can display imagery, title, and author for an e-book that is actively being read.

In some implementations, the input component 314 of the user interface 310 can process inputs from the user in connection with displaying page content 311. As an example, the inputs can correspond to page events 315, such as page transition inputs, chapter inputs or cluster inputs. Other kinds of input include, for example, searching (e.g., search for word in text), and social sharing (e.g., phrase).

In some examples, the system 300 includes an e-book usage monitor 328. The usage monitor 328 can track events that are indicative of the user's reading actions and behavior, such as parameters that track the state of an e-book in reference to timing parameters and/or scheduling information. In some implementations, the usage monitor 328 monitor for inputs such as page events 315. Additionally, the usage monitor 328 can take into account metadata associated with the e-book information (e.g., page count, chapter count, pages per chapter). From the monitored parameters and the metadata, the usage monitor can further determine metric information 331 that is descriptive of the user-experience or behavior with the specific e-book. By way of example, the metric information 331 can be based on (i) a completed portion of an e-book, and/or (ii) an observed completion rate for a given portion of a book or chapter. Specific examples of metric information 331 include (i) information indicating a portion of the e-book that the user has completed (e.g., by percentage, or page count etc.), (ii) an estimated duration of time for completing an e-book or a segment of an e-book (e.g., relative to the whole book or current chapter), (iii) a schedule or time when the user reads key active e-book, and (iv) how much time the user has spent reading the particular e-book.

In some variations, the content screen 313 can incorporate metric information 331 regarding the user's current activity or behavior for the active e-book. In some implementations in which off-state display is possible, the metric information 331 can be integrated into the content screen 313 and displayed when the device is in the off-state. As an alternative or variation, the metric information 331 can be displayed to the user through the user interface 310, in response to, for example, user input or other commands.

As an addition or alternative, a social component 342 can retrieve social parameters 341 for a particular e-book (e-book specific social parameters). The social parameters 341 can be used by the component 342 to determine social metric information 343 about an e-book from the network service 120. As examples, the social component 342 can determine, for an e-book that a user is currently reading, one or more social metric information 343 such as the following: (i) a number of individuals who have read the e-book (e.g., number of persons who have read a particular e-book title in the past month), (ii) number of individuals who are currently reading the e-book, (iii) a score indicating a feedback (e.g. number of persons who said they like the e-book) for the e-book, and/or (iv) average time individuals took to read the e-book. Additionally, the social metric information 343 can compare metrics of the user to those of other users for the same e-book (e.g., compare the rate at which existing user completes book to that of other users). The social metric information 343 can also be integrated into the content screen 313. Thus, in some implementations, the social metric information 343 can also be integrated into the off-state display of the computing device. As an alternative or addition, the social metric information 343 can be displayed to the user interface 310 when the computing device is active.

Methodology

Figure 4:
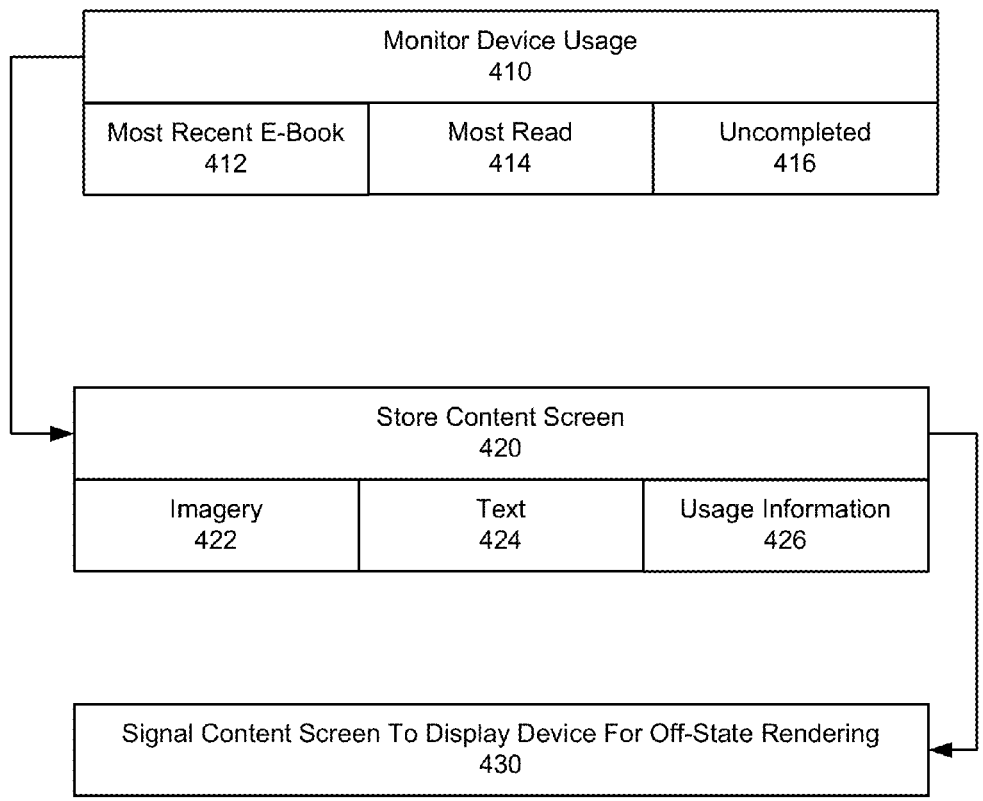
FIG. 4 illustrates an example method for providing off-state rendering of content on an inactive display of a computing device, according to an embodiment.
Figure 5:
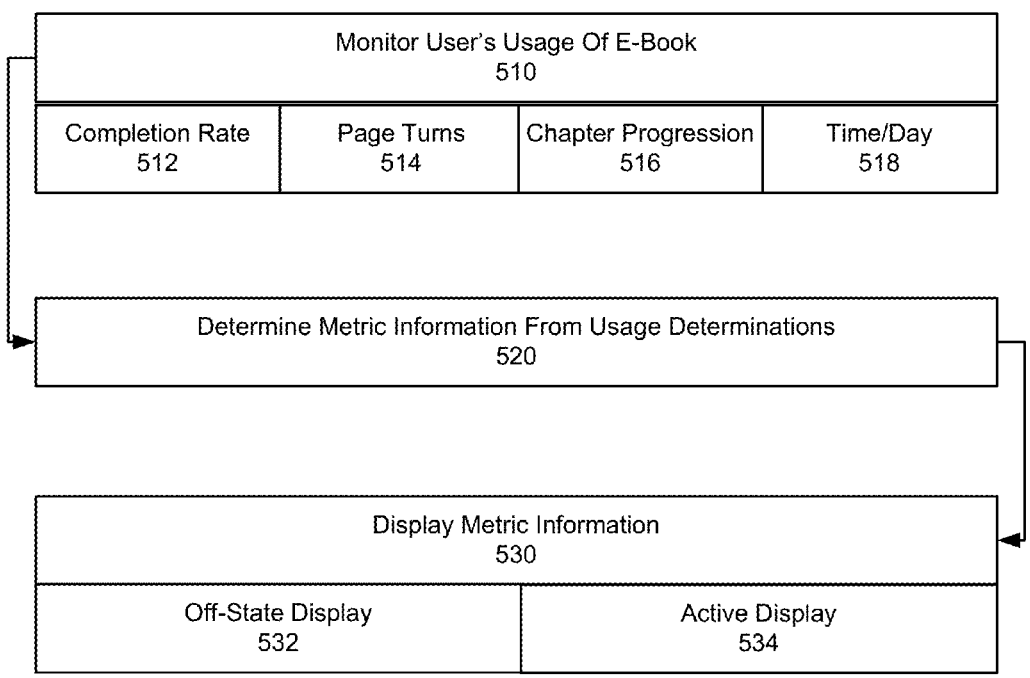
FIG. 5 illustrates an example method for determining metric information that is indicative of the user's reading activity or behavior for an active e-book.

FIG. 4 illustrates an example method for providing off-state rendering of content on an inactive display of a computing device, according to an embodiment. FIG. 5 illustrates an example method for determining metric information that is indicative of the user's reading activity or behavior pertaining to an active e-book. Examples such as described with FIG. 4 or FIG. 5 may be implemented using components such as described with FIG. 1, FIG. 2, or FIG. 3. Accordingly, reference may be made to elements of other figures for the purpose of illustrating suitable elements or components for performing a step or sub-step being described.

With reference to FIG. 4, usage of an e-reader is monitored (410). The monitored information can identify one or more e-books that are currently active on the e-book. An active e-book may signify an e-book that the user is currently reading, or one the user repeatedly accessed during a recent time frame. In one implementation, the active e-book corresponds to the most recently accessed e-book that is being read or is unfinished (412). In another implementation, the active e-book corresponds to the e-book that the user has spent the most time reading (414), as compared to, for example, other unfinished e-books, or over a recent duration of time. Still further, the active e-book can correspond to any e-book that the user started but has not finished (416).

A content screen is stored for the determined active e-book(s) (420). The content screen can include imagery (422) provided by, for example, a publisher of the book. The imagery can include graphics that portray a front cover or jacket of the e-book. In addition to imagery, text content can be incorporated into the content screen for the active e-book (424). The text content can include, for example, the title and/or the author of the active e-book. Other text content pertaining to that particular e-book, such as user reviews, can also be included as part of the content screen.

As an addition or alternative, metric information relating to the reading actions and behavior of the user in the context of the particular active e-book can also be displayed as part of the content screen (426). The metric information can display, for example, information indicative of the amount of reading the user has to do to complete the e-book (e.g., number of pages left, percentage portion remaining etc.), or the estimated time the user has remaining to complete the e-book or portion thereof (e.g., chapter). Various other kinds of statistics can also be displayed for the metric information, such as the average duration of time that the user reads an e-book in a given session, or over the course of the day, or the rate at which the user reads, or the preferred reading times of the user.

When the device is switched into an off-state, the display device can be signaled to display the content screen of an active e-book for off-state rendering (430). The off-state rendering can be static. In one implementation, the off-state rendering provides a visual representation (e.g., imagery, title, author) of a single active e-book that is currently being read by the user. One benefit achieved is that the computing device reflects an image that simulates an actual book. Additionally, some examples provide that metric information can be incorporated into the content screen, so as to inform the user information about, for example, the state of reading for the particular e-book.

In variations, the off-state rendering can display the visual representation of multiple active e-books. For example, the display screen can be segmented, and each segment can display the visual representation of an active e-book (e.g., an e-book that the user has started but not finished).

With reference to FIG. 5, the usage of an e-book on a computing device can also be monitored (510). The monitoring can determine parameters that are based on, for example, the completion rate at which the user is expected to complete an e-book (512). This can include timing parameters reflecting the user's progression through the e-book to the current state. Other examples of monitored information can include page turns (514), chapter progressions (516) and/or time of day when the user reads (518).

From the determined usage parameters, metric information can be determined (520). The metric information can provide, for example, information regarding where the user is in the progression of the e-book (e.g., what page or chapter the user is on, the percentage of pages or chapters remaining for the user to compete etc.), the amount of time the user has remaining to complete the e-book or a given segment (e.g., chapter), or other information (e.g., day or time the user prefers reading etc.).

The metric information can be displayed in a variety of context (530). In some embodiments, the metric information can be displayed as part of the content screen when the device is in an off-state (532). In variations, the metric information can be displayed through the user-interface, such as through menu options that enable the user to view different kinds of metric information (534).

Examples

Figure 6A:
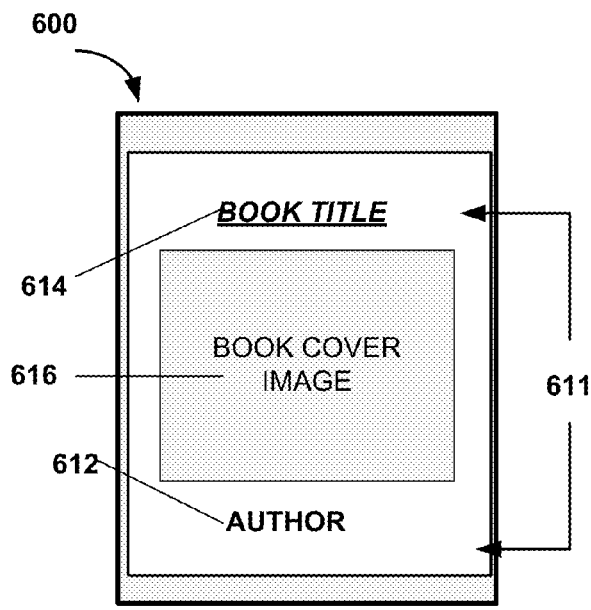
FIG. 6A and FIG. 6B illustrate examples of computing devices that render off-state content screens corresponding to an e-book that is in active use on that device.
Figure 6B:
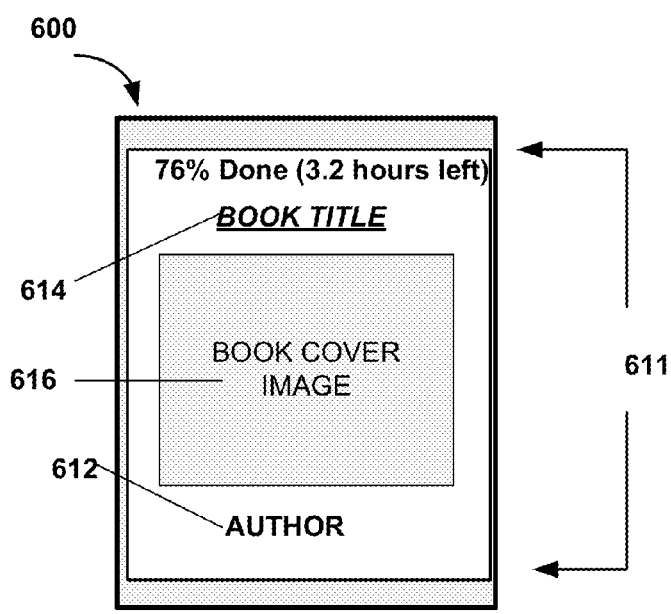

FIG. 6A and FIG. 6B illustrate examples of computing devices that render off-state content screens corresponding to an e-book that is in active use on that device. Examples such as provided by FIG. 6A and FIG. 6B can be implemented by various embodiments described herein, such as by systems and devices described with FIG. 1 through FIG. 3.

With reference to FIG. 6A, the computing device 600 includes a display screen 610 that is part of the display device and capable of rendering off-state content. For example, the display screen 610 can be provided with an electronic paper type display. In some embodiments, the display screen 610 displays a visual representation 611 of an e-book that is in active use. The visual representation can include a listing of an author 612, a book title 614, and imagery 616. The imagery 616 can include a book cover image, such as provided for marketing the e-book, and/or a counterpart physical media book. The selection of the e-book for which the visual representation is used in the off-state rendering can be based on selection criteria that accounts for the active state of the e-book. For example, the selection criteria can identify the e-book that was most recently read on the computing device, the e-book that was most recently read on the computing device and which is in an uncompleted state, or the e-book that is uncompleted but most frequently read in a given duration of time (e.g., spanning multiple sessions) preceding the current off-state. In this way, the off-state rendering can provide the appearance of an actual physical book that corresponds to the selected active e-book.

In an example of FIG. 6B, an off-state rendering further provides metric information 622 about the user's reading action or behavior. For example, the metric information 622 displays the percentage of the e-book that has been read, as well as the amount of time needed for the user to complete reading the e-book (based on, for example, a determined reading velocity). As another example, the metrics can reflect information about a particular chapter, such as the amount of time that the user has to complete a given chapter.

Although illustrative embodiments have been described in detail herein with reference to the accompanying drawings, variations to specific embodiments and details are encompassed by this disclosure. It is intended that the scope of embodiments described herein be defined by claims and their equivalents. Furthermore, it is contemplated that a particular feature described, either individually or as part of an embodiment, can be combined with other individually described features, or parts of other embodiments. Thus, absence of describing combinations should not preclude the inventor(s) from claiming rights to such combinations.

What is claimed is:

1. A method for operating a computing device, the method being implemented by one or more processors and comprising:
    monitoring usage of the computing device when the computing device is in an active state;
    storing, based on the monitoring, a content screen corresponding to a digital content item that is in use when the computing device is in the active state;
    switching the computing device as a whole into an off-state; and
    displaying, in response to the computing device being switched into the off-state, the content screen on an electronic paper type display of the computing device, wherein the content screen includes a first information including at least a user's usage of the digital content item, and a second information including at least other user's usage of the digital content item, and a score corresponding to a feedback of the digital content item by the other user.

2. The method of claim 1, wherein monitoring usage of the computing device includes determining one or more usage parameters about a state of consumption of the digital content item, and wherein the method further comprising displaying metric information, corresponding to the one or more usage parameters, as part of the content screen when the computing device is placed in the off-state.

3. The method of claim 2, wherein the state of consumption is based on a portion of the digital content item that has been consumed.

4. The method of claim 2, wherein determining the one or more metrics includes calculating a rate of consumption by a user of the digital content item, and determining the one or more usage parameters based at least in part on the calculated rate of consumption.

5. The method of claim 1, wherein the digital content item corresponds to a text-based content item, and wherein the content screen corresponds to an imagery representing a cover of the text-based content item.

6. The method of claim 5, wherein monitoring usage of the computing device includes determining one or more usage parameters about a state of completion of the text-based content item, and wherein the method further comprising displaying metric information based on the one or more usage parameters as part of the content screen when the computing device is placed in the off-state.

7. The method of claim 5, wherein the text-based content item corresponds to one of an e-book, an electronic magazine, and a comic book.

8. The method of claim 1, wherein storing the content screen corresponding to the digital content item includes storing the content screen for a most-recently accessed digital content item.

9. A computing device comprising:
memory resources that store a set of instructions, and a collection of text-based digital content items;
a processor; and
an electronic paper type display screen;
wherein the processor is configured to:
monitor usage of the computing device when the computing device is in an active state,
store in the memory resources based on the monitoring usage, a content screen corresponding to a digital content item that is in active use,
switch the computing device as a whole into an off-state, and
display, in response to the computing device being switched into the off-state, the content screen on an electronic paper type display of the computing device, wherein the content screen includes a first information including at least a user's usage of the digital content item, and a second information including at least other user's usage of the digital content item, and a score corresponding to a feedback of the digital content item by the other user.

10. The computing device of claim 9, wherein the processor is further configured to monitor usage of the computing device by determining one or more usage parameters about a state of consumption of a text-based digital content item that is in active use.

11. The computing device of claim 10, wherein the processor is further configured to transmit a signal to the electronic paper type display to display metric information, corresponding to the one or more usage parameters, as part of the content screen when the computing device is placed in the off-state.

12. The computing device of claim 11, wherein the state of consumption is based on a portion of the text-based digital content item that has been consumed.

13. The computing device of claim 9, wherein the content screen includes an imagery representing a cover of the text-based content item.

14. The computing device of claim 9, wherein the text-based content item corresponds to one of an e-book, an electronic magazine, and a comic book.

15. The computing device of claim 9, wherein the processor is further configured to signal the text-based display screen to display the content screen corresponding to an uncompleted text-based digital content item.

16. The computing device of claim 9, wherein the processor is further configured to signal the text-based display screen to display the content screen corresponding to a most-recently accessed text-based digital content item.

17. The computing device of claim 9, wherein the content screen includes an imagery representing a cover of the text-based content item.

18. A non-transitory computer-readable medium that stores instructions for operating a computing device, the instructions being executable by one or more processors to cause the one or more processors to perform a method comprising:
monitoring usage of the computing device when the computing device is in an active state;
storing, based on the monitoring, a content screen corresponding to a digital content item that is in use when the computing device is in the active state;
switching the computing device as a whole in an off-state; and
displaying, in response to the computing device being switched into the off-state, the content screen on a display of the computing device, wherein the content screen includes a first information including at least a user's usage of the digital content item, and a second information including at least other user's usage of the digital content item, and a score corresponding to a feedback of the digital content item by the other user.

19. The method of claim 1, wherein the second information further includes at least one of a number of other users that have used the digital content item, and an average time taken by another user to use the digital content item.

20. The method of claim 19, further comprising:
determining based on the second information, a performance of the user with respect to the digital content item.

21. The method of claim 1, wherein the first information further includes information corresponding to the user's schedule of reading the digital content item.

\* \* \* \* \*